(12) United States Patent
Tiwari et al.

(10) Patent No.: US 10,538,226 B1
(45) Date of Patent: Jan. 21, 2020

(54) VEHICLE BRAKING SYSTEM AND METHOD

(71) Applicant: Starsky Robotics, Inc., San Francisco, CA (US)

(72) Inventors: Kartik Tiwari, San Francisco, CA (US); Isaac Brown, San Francisco, CA (US)

(73) Assignee: Starsky Robotics, Inc., San Francisco, CA (US)

(*) Notice: Subject to any disclaimer, the term of this patent is extended or adjusted under 35 U.S.C. 154(b) by 0 days.

(21) Appl. No.: 16/505,166

(22) Filed: Jul. 8, 2019

Related U.S. Application Data

(60) Provisional application No. 62/694,903, filed on Jul. 6, 2018.

(51) Int. Cl.
| | |
|---|---|
| *B60T 7/16* | (2006.01) |
| *B60T 7/04* | (2006.01) |
| *F16K 5/18* | (2006.01) |
| *B60W 10/192* | (2012.01) |
| *B60T 8/36* | (2006.01) |

(52) U.S. Cl.
CPC .......... *B60T 7/16* (2013.01); *B60T 7/042* (2013.01); *B60W 10/192* (2013.01); *F16K 5/18* (2013.01); *B60T 8/368* (2013.01)

(58) Field of Classification Search
CPC . B60T 7/16; B60T 7/042; B60T 8/368; F16K 5/18; B60W 10/192
See application file for complete search history.

(56) References Cited

U.S. PATENT DOCUMENTS

| | | | |
|---|---|---|---|
| 6,206,484 B1* | 3/2001 | Ganzel | B60T 8/268 188/358 |
| 6,512,452 B1* | 1/2003 | Brannan | B60T 13/74 188/112 R |
| 7,393,065 B2 | 7/2008 | Craig et al. | |
| 2004/0207253 A1* | 10/2004 | Nakayasu | B60T 8/363 303/113.5 |
| 2019/0152459 A1* | 5/2019 | Dieckmann | B60T 13/662 |
| 2019/0168724 A1 | 6/2019 | Vandenberg et al. | |

* cited by examiner

*Primary Examiner* — Rodney A Butler
(74) *Attorney, Agent, or Firm* — Jeffrey Schox; Diana Lin

(57) ABSTRACT

As system for vehicle braking includes: a pedal actuated valve, including a first vent outlet in fluid communication with a fluid sink, a first supply inlet in fluid communication with a fluid source, and a first delivery outlet in fluid communication with a load; an electronically controlled valve in parallel with the pedal actuated valve, including a second vent outlet connected to the fluid sink via the first vent outlet, a second supply inlet in fluid communication with the fluid source, and a second delivery outlet in fluid communication with the load; and, a check valve connected between the load and the first delivery outlet downstream of the second vent outlet. A method for vehicle braking includes: operating at least one of the pedal actuated valve and the electronically controlled valve.

20 Claims, 8 Drawing Sheets

200, a first delivery outlet 116 in fluid commu-
VEHICLE BRAKING SYSTEM AND METHOD

CROSS-REFERENCE TO RELATED APPLICATIONS

This application claims the benefit of U.S. Provisional Application No. 62/694,903, filed 6 Jul. 2018, which is incorporated in its entirety by this reference.

TECHNICAL FIELD

This invention relates generally to the automotive field, and more specifically to a new and useful vehicle braking system and method in the automotive field.

BACKGROUND

In autonomous and semi-autonomous control of automotive vehicles, it can be important to ensure that braking systems have redundancies in the event of control failure or other system failure. In particular, large commercial vehicles (e.g., semi-tractor trailers, box trucks, etc.) that are retrofitted with autonomous and/or semi-autonomous capability can have especially negative failure consequences due to the size, weight, and control complexity of such vehicles, yet are typically not equipped with drive-by-wire or other electronic braking systems that facilitate redundancies in the context of autonomous or semi-autonomous control.

Thus, there is a need in the automotive field to create a new and useful system and method for vehicle braking. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
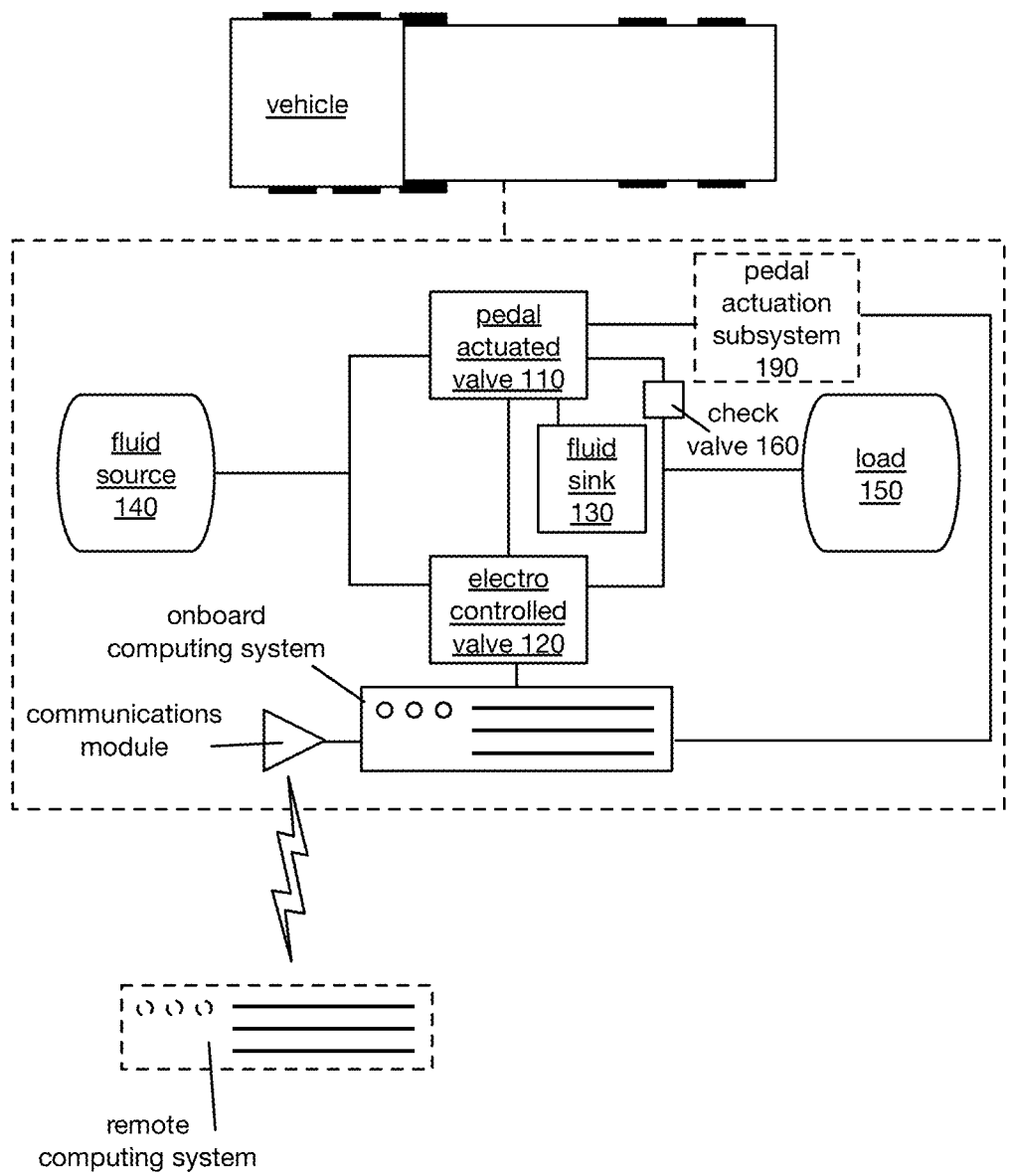
FIG. 1 depicts a variation of the vehicle braking system.

As shown in FIG. 1, the vehicle braking system 100 includes: a pedal actuated valve 110, including a first vent outlet 114 in fluid communication with a fluid sink 130, a first supply inlet 112 in fluid communication with a fluid source 140, and a first delivery outlet 116 in fluid communication with a load 150; an electronically controlled valve 120 (equivalently referred to herein as an electronically actuated valve) in parallel with the pedal actuated valve 110, including a second vent outlet 124 connected to the fluid sink 130 via the first vent outlet 114, a second supply inlet 122 in fluid communication with the fluid source 140, and a second delivery outlet 126 in fluid communication with the load 150o; and, a check valve 160 connected between the load 150 and the first delivery outlet 116 downstream of the second vent outlet 124. The system 100 also includes a network of fluid transmission lines 170 that form the connections between system components. The system 100 can optionally include: a control subsystem, a pedal actuation subsystem 190, and any suitable components for handling compressed fluid.

Figure 10:
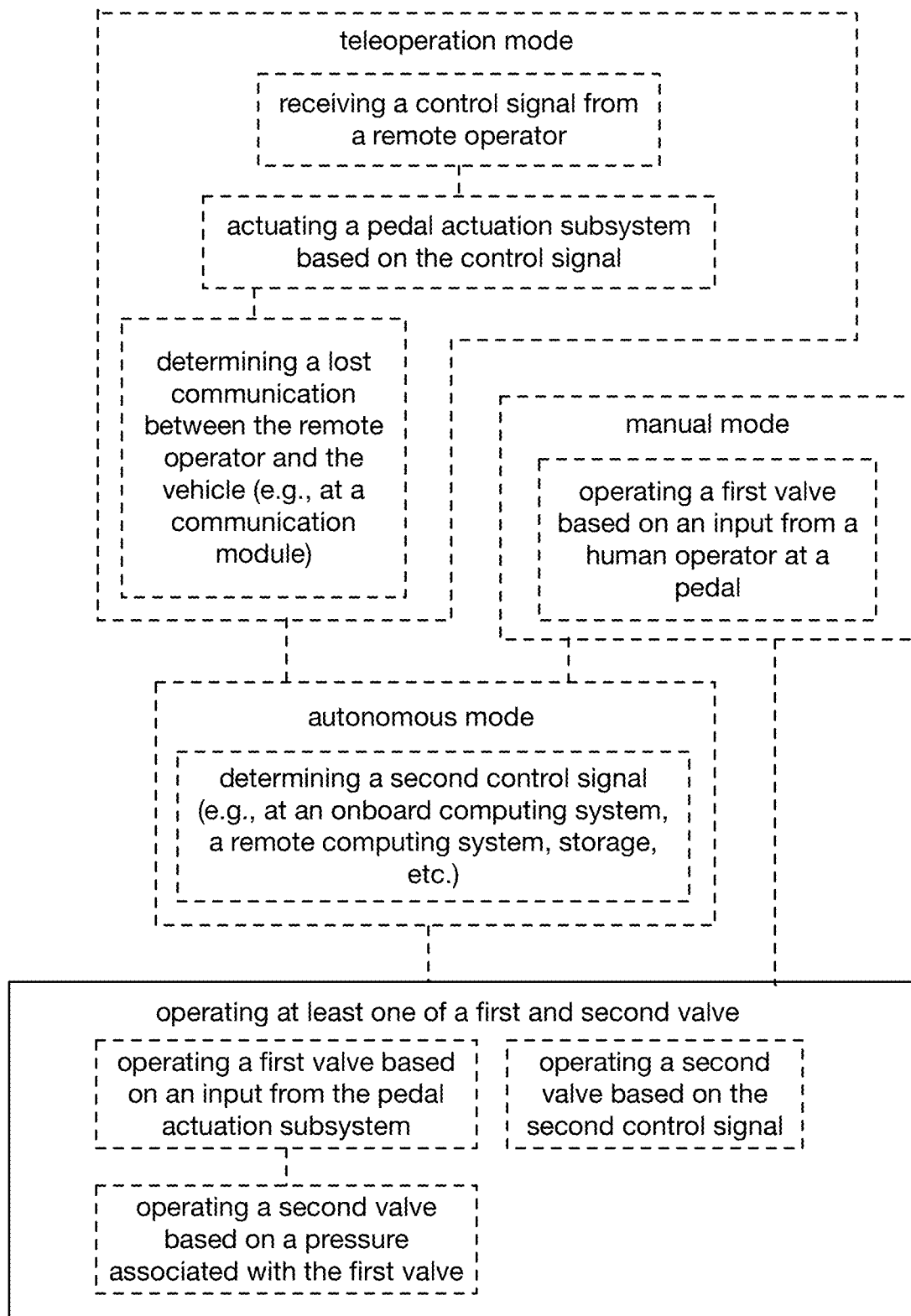
FIG. 10 depicts a variation of a method for operating the vehicle braking system.

As shown in FIG. 10, a method for vehicle braking includes: operating at least one of a first valve and a second valve. Additionally, the method can include any or all of: receiving a control signal from a remote operator; actuating a pedal actuation subsystem based on the control signal; determining a lost communication between the remote operator and the vehicle; operating a pedal actuated valve based on an input from a human operator at a pedal of the vehicle; determining a second control signal (e.g., at an onboard computing system, a remote computing system, storage, etc.); operating a first valve based on an input from the pedal actuation subsystem; operating a second valve based on the second control signal; operating a second valve based on a pressure associated with the first valve; and/or any other suitable processes.

2. Benefits

Variations of the system and method can afford various benefits and/or advantages.

First, variations of the system and/or method can enable or enhance remote controllability of a vehicle by providing electronic controllability to a fluid braking system. For example, a vehicle designed for manual operation (e.g., manual braking via a brake pedal or other suitable manual actuator) can be equipped with the vehicle braking system, wherein the vehicle braking system includes an onboard computing system communicatively coupled to a remote computing system, such that the vehicle brakes can be remotely activated (e.g., in response to receipt of a braking instruction). In a specific example of this variation, a single remote operator (teleoperator) can monitor (e.g., remotely activate a set of brakes for) a set of multiple vehicles (e.g., 10 vehicles, between 1 and 10 vehicles, greater than 10 vehicles, between 2 and 20 vehicles, etc.) simultaneously.

Second, variations of the system and/or method can enable robustness of the vehicle against control failure (e.g., failure-resistant redundancy). In examples, the vehicle braking system can be configured to automatically and actively apply the brakes in the event of communication failure between the vehicle and a remote operator, a failure of an autonomous vehicle control system (e.g., data link severance, computational error, sensor failure, etc.), and any other failure in vehicle control or operation during driving of the vehicle. In such variations, the vehicle braking system can provide a parallel control pathway (e.g., in parallel to a pedal-actuated control pathway) that is separately controlled and/or actuated, to eliminate a single-point failure mode associated with the pedal actuation of vehicle brakes.

However, variations of the system and/or method can otherwise suitable afford any suitable benefits and/or advantages.

3. System

The system 100 functions to provide electronically-controllable operation (e.g., braking) to a vehicle equipped with a fluid braking system (e.g., air brakes, hydraulic brakes, etc.). The system 100 can also function to provide a secondary (e.g., redundant, parallel, etc.) braking system in addition to the integrated pedal-actuated braking system (e.g., the braking system originally integrated into the vehicle designed to be manually operated by a driver of the vehicle). The system 100 can also function to enable fail-safe operation to an autonomous or semi-autonomous vehicle (e.g., a teleoperated vehicle, a remotely operated vehicle, a supervised autonomous vehicle, etc.) equipped with a fluid braking system (e.g., wherein power or control loss causes components of the system to automatically engage the fluid-driven brakes). and/or have any other suitable function.

In preferred variations of the system (e.g., those implemented in a semi-truck), the compressed fluid handled by the vehicle braking system is preferably air (e.g., compressed air). This can, for instance, promote an ease of coupling and/or decoupling a tractor braking system with a trailer (e.g., detachable trailer) braking system, since only a set of fluidic pathways (e.g., hoses) needs to be coupled, rather than requiring a volume of fluid to be added to the system. Furthermore, a compressed air system can be less sensitive to minor leaks. In a specific example of a truck air braking system, an air compressor fills two tanks with compressed air, wherein one tank is used to apply braking to a front set of tractor wheels and the other tank is used to apply braking to a rear set of tractor wheels (e.g., and trailer wheels).

Additionally or alternatively, the vehicle braking system can be utilized with any other suitable fluid (e.g., hydraulic fluid, liquid, gas, etc.).

The system 100 can include, be implemented by or in conjunction with, and/or execute at various related systems. The vehicle braking system 100 is preferably used to apply a braking force to an automotive vehicle equipped with air brakes, and more particularly to a semi-truck in a tractor-trailer configuration, wherein the cab of the semi-truck and the trailer are each coupled to the output of the vehicle braking system (e.g., the compressed air output delivered by the vehicle braking system). The vehicle braking system 100 is preferably connected to (e.g., via fluid lines, pressurized hoses, etc.) the air brakes of a truck and of a trailer, in a tractor-trailer configuration; however, the vehicle braking system can additionally or alternatively be connected to any number of cars (e.g., in a train of cars) or mutually-connected vehicles equipped with fluid braking systems. The brakes connected to the vehicle braking system 100 are preferably air brakes but can additionally or alternatively include any brakes that are actuated by pressure driven fluid (e.g., hydraulic fluid). However, the vehicle braking system 100 can additionally or alternatively be used in conjunction with a private passenger vehicle, a commercial passenger vehicle, a car, a truck, a non-automotive land vehicle (e.g., a locomotive, a passenger train, a light rail system, a mobile robot, wheeled or tracked construction vehicles, other industrial vehicles such as a cherry-picker, mobile crane, etc.), and any other suitable vehicle that can be equipped with fluid-driven brakes (e.g., air brakes, hydraulic brakes, etc.).

The vehicle braking system 100 is connected between at least one fluid source, at least one fluid sink, and a load. The fluid source is preferably an air compressor, which can be driven by the engine of the vehicle (e.g., via the crankshaft, a belt, directly from the timing gears, etc.), powered from an onboard electrical power source (e.g., a battery, an alternator, etc.), or otherwise suitably driven and/or powered. The compressed air is preferably provided to the braking system from an air compressor integrated with the vehicle (e.g., powered directly by the engine of the vehicle) that is automatically activated when the vehicle is turned on. However, in alternative variations, the compressed fluid can be provided from a reservoir (e.g., a stored volume of compressed fluid), a closed system (e.g., a network of pressure vessels through which pressurized fluid is exchanged), or otherwise suitably provided. The fluid source can additionally or alternatively include a hydraulic fluid reservoir, a pre-filled compressed fluid tank (e.g., an air tank, an emergency reservoir of compressed fluid, etc.), and/or any other suitable source of pressurized fluid. In some variations, the system can be connected to a plurality of fluid sources, which can be of differing types or the same type. The fluid sink is preferably the external environment (e.g., the atmosphere surrounding the vehicle). However, the fluid sink can additionally or alternatively be any suitable vessel or region that can receive pressurized fluid (e.g., a reservoir, the internal environment of the vehicle, the internal environment of a trailer of the vehicle, the tires of the vehicle, etc.). The load is preferably a set of air brakes, which can be of any suitable type (e.g., default-closed, spring-loaded, default-open, drum brakes, disc brakes, parking brakes, service brakes, etc.) of braking mechanism driven by air pressure. In some variations, the brake is applied to the wheel upon reduction of pressure upstream of the brake (e.g., by bleeding compressed fluid out of the upstream region), whereas in alternative variations, the brake is applied to the wheel upon increasing the pressure upstream of the brake. However, the load can additionally or alternatively be any suitable pressure-actuated device (e.g., a pneumatic actuator, a hydraulic actuator, an air spring, etc.).

Figure 5:
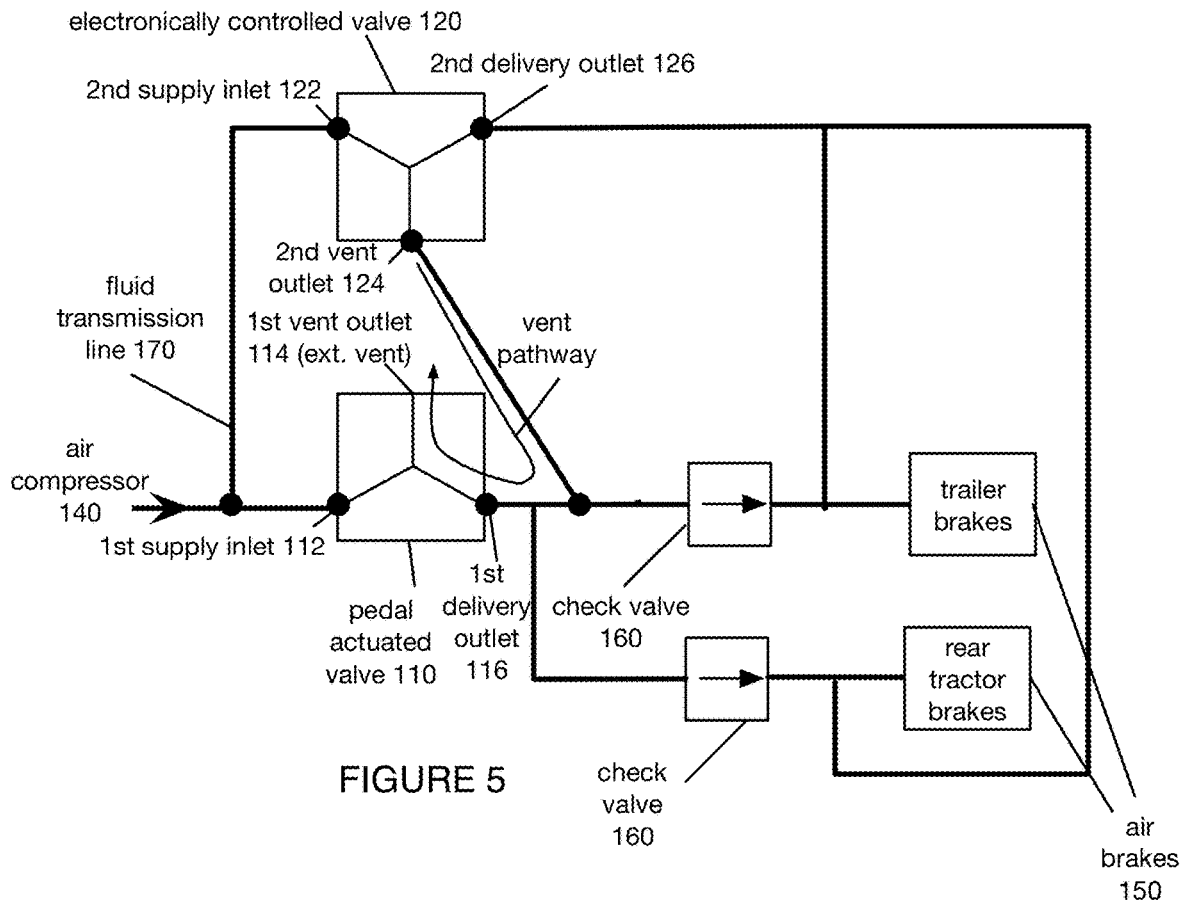
FIG. 5 depicts a specific example of the vehicle braking system.

A vehicle braking system 100 is preferably integrated with the vehicle at each service braking system (e.g., each individual service braking system, each independent service braking system, each redundant service braking system, etc.) of the vehicle, which can function to maintain an existing redundancy in the original braking system of the vehicle (e.g., separate front wheel and rear wheel braking systems). In some variations, (e.g., those integrated with a semi-truck in a tractor-trailer configuration), a first vehicle braking system 100 is integrated into the front wheel service braking system and second vehicle braking system 100 is integrated into the rear wheel service braking system (e.g., which can additionally include the trailer service braking system). The first and second braking systems preferably include similar and/or the same components arranged in a similar or the same arrangement (e.g., with an extra check valve as described below for the rear/trailer brake line system), but can additionally or alternatively be different in order to optimally integrate with each of the service braking systems. In a specific example, for instance, a first braking system 100 is integrated into an air brake line associated with the front wheels and a second braking system 100 is integrated into an air brake line associated with the rear wheels and the trailer wheels, wherein the second braking system (e.g., as shown in FIG. 5) in integrated into an air brake system (e.g., OEM vehicle braking system) through a set of entry points (e.g., two entry points –1 for the rear wheels and 1 for the trailer wheels, 1 entry point, etc.) and includes two check valves (e.g., one for the rear brakes and one for the trailer brakes). Multiple (e.g., two, greater than two, etc.) entry points are sometimes required for the rear/trailer braking system based a restricted access to the rear air brake lines and/or trailer air brake lines in some conventional vehicle OEM braking systems. Further additionally or alternatively, a single vehicle braking system 100 can be implemented, one or more vehicle braking systems 100 can be integrated into a parking (e.g., emergency) brake, and/or any suitable number of vehicle braking systems 100 can be integrated into a vehicle.

In variations having a first and second braking system, the first and second braking system are preferably operated based on the same control signal(s) but can additionally or alternatively be individually controlled, alternating in which system is being controlled, prioritized (e.g., based on a number of uses of the corresponding valves), and/or otherwise controlled.

The vehicle braking system 100 is preferably integrated with a vehicle after vehicle manufacture by an original equipment manufacturer (OEM) (e.g., as a retrofit, a third-party modification, etc.). In particular, the vehicle with which the system 100 is integrated preferably lacks drive-by-wire capability other than that provided by the vehicle braking system 100 and any after-market remotely- or electronically-controlled actuation subsystems (e.g., as described above, or other similar systems). However, the vehicle braking system 100 can additionally or alternatively be integrated with a vehicle during manufacture, pre-sale, and/or at any other suitable time during construction, commissioning, and/or operation of the vehicle during its usable lifetime.

In variations of the vehicle braking system 100 configured to be integrated into a tractor-trailer semi-truck, the tractor-trailer semi-truck preferably already includes a first set of redundancies in its original (e.g., OEM, modified OEM, etc.) braking system, wherein the set of redundancies functions to enable braking of the vehicle in various failure modes. The first set of redundancies preferably includes separate air brake lines, each with an associated tank of compressed air from the air compressor, for the front and rear wheels of the semi-truck tractor, wherein only one of the air brake lines is required to completely stop the semi-truck. In variations of the semi-truck including a trailer, the trailers wheels are preferably connected to the rear wheel air brake line, but can additionally or alternatively be connected to any suitable brake line (e.g., the front wheel air brake line), have a separate brake line, or be otherwise arranged. The original braking system further preferably includes an emergency braking system (e.g., parking brake) configured to apply braking to a set of wheels in the event of lost pressure in the air braking system.

In preferred variations, the vehicle braking system 100 functions to maintain these redundancies while creating an additional redundancy in the form an electronically actuated valve arranged in parallel with a pedal actuated valve of the original braking system, which can be especially critical in variations of the system configured to operate in a teleoperation mode. In a first example, the vehicle braking system 100 creates a fully redundant braking system, wherein each of the front wheel and rear wheel/trailer wheel brake lines is supplemented with a redundancy in the form of an electronically actuated valve arranged in parallel with the pedal actuated valve. In a second example, the vehicle braking system 100 creates a redundancy for a portion of the original braking system, such as the front wheel air brake line only.

The vehicle braking system 100 can additionally or alternatively create and/or modify any suitable redundancies in any or all of the vehicle's original braking system.

The vehicle braking system 100 can include or interface with a database (e.g., an onboard database, a remote database, a server, etc.), for such purposes as logging or recording information (e.g., in relation to component failure, failure event data, etc.), retrieving information (e.g., mapping data, environmental data, etc.), retrieving or receiving control instructions stored at the database, and any other suitable purpose.

The vehicle braking system 100 can include or interface with a communication system (e.g., a communication module, included by and/or distinct from the control subsystem), for such purposes as transmitting and receiving data (e.g., to or from a remote computing system), receiving control instructions, and any other suitable purpose.

The system is preferably configured to receive one or more inputs (e.g., during a teleoperation mode) from a remote operator, equivalently referred to herein as a teleoperator, wherein the remote operator is remotely located from the vehicle (e.g., outside the vehicle, between 0 and 10 miles away from the vehicle, more than 10 miles away from the vehicle, more than 100 miles away from the vehicle, at a fleet management center, etc.). The teleoperator preferably monitors a driving status of the vehicle based on a video feed taken from a set of one or more cameras arranged within or on the vehicle (e.g., on a dashboard, attached to a side of the vehicle, attached to a top surface of the vehicle, attached to a back surface of the vehicle, mounted to a hood of the vehicle, attached to a side mirror of the vehicle, attached to a rear-view mirror of the vehicle, etc.), wherein the video feed depicts at least a front view (e.g., with a front-facing camera) of the vehicle, the front view depicting the path of the vehicle. The video feed can additionally or alternatively depict any or all of: a back view of the vehicle (e.g., to determine if another vehicle is approaching, to back up the vehicle, to park the vehicle at a loading dock, etc.), a side view of the vehicle (e.g., to determine obstacles approaching from the side, to merge, to change lanes, etc.), a view above the vehicle, a view below the vehicle, an inside view of the vehicle (e.g., inside the cabin), and/or any other suitable views.

A single teleoperator preferably monitors and determines inputs (e.g., dynamically determines vehicle-specific inputs) for a set of multiple vehicles, thereby reducing a number of required operators as compared to conventional vehicle systems (e.g., one operator per vehicle). Additionally or alternatively, multiple operators can be associated with a single vehicle (e.g., a human operator and a teleoperator, multiple teleoperators for redundancy, etc.), such as in a system setup wherein a first operator monitors a first set of multiple vehicles and a second operator monitors a second set of multiple vehicles, the first and second set of multiple vehicles sharing at least one vehicle in common. Alternatively, each vehicle can be monitored by a single operator and/or otherwise monitored (e.g., by a teleoperator with an autonomous mode as a backup, autonomously with a teleoperator as backup, manually by a human operator onboard the vehicle, etc.).

The set of inputs received from one or more teleoperators preferably includes a set of control signals, which individually and/or collectively function to control the braking of the vehicle. Each control signal can include one or more braking parameters, such as any or all of: a binary braking command (e.g., braking "on" or braking "off", apply braking or release braking, etc.), a braking magnitude (e.g., a percentage of maximum braking, a distance of brake pedal depression, etc.), a temporal parameter (e.g., a time until vehicle reaches a full stop, a "smoothness" of braking, etc.), a location parameter (e.g., a destination for the vehicle to reach a complete stop, a dynamic landmark selection at which the vehicle reaches a complete stop, a set of GPS coordinates, etc.), and/or any other suitable parameter(s). Additionally or alternatively, the set of control signals and/or set of inputs can include any other suitable information (e.g., speed limit information, desired speed information, lane change commands, merging commands, driving directions, GPS coordinates, etc.).

Each of the set of inputs is preferably received wirelessly (e.g., through WiFi, through Bluetooth, through radio frequency, etc.) at a communication module associated with the vehicle (e.g., part of the control subsystem, separate from the control subsystem, etc.), wherein a control subsystem of the vehicle controls an operation of one or more braking valves based on the input. Additionally or alternatively, any or all of the set of inputs can be generated onboard the vehicle (e.g., during an autonomous operation mode, during a failure mode, etc.), received from a wired connection, received from a human operator at a brake pedal, or otherwise generated and/or received. In variations wherein the set of inputs are received wirelessly, the set of inputs are preferably received in real time or substantially real time (e.g., with a latency of less than 1 second, with a latency of less than 0.5 seconds, with a latency of less than 0.1 second, etc.), but can additionally or alternatively received at any suitable time(s) (e.g., prior to operating the vehicle along a predetermined route).

The system can additionally include and/or be configured to interface with a teleoperator interface subsystem, which functions to provide information related to the vehicle status to a teleoperator and receive the set of inputs. The teleoperator interface subsystem preferably includes a display configured to display a video feed of the vehicle (e.g., as described above), wherein the teleoperator determines a set of inputs based on the video feed. Additionally or alternatively, the teleoperator can receive any or all of: audio inputs, haptic inputs (e.g., replicating conditions of the road, indicating a pothole or other obstacle, indicating that the vehicle is traversing over a rumble strip, etc.), and/or any other suitable inputs. The teleoperator interface subsystem preferably additionally includes a component configured to receive the inputs from the teleoperator. The component can be configured to mimic a conventional braking system onboard the vehicle (e.g., general braking system, braking system specific to the vehicle being monitored, etc.), such as any or all of: a brake pedal, steering wheel, driver's seat, and/or any other suitable components, wherein the components mimic an environment onboard the vehicle. Additionally or alternatively the interface subsystem can include any number of virtual components, gaming components (e.g., remote controllers, joysticks, etc.), and/or any other suitable components.

In one variation, the teleoperator interface subsystem includes a display showing a live video feed of the vehicle and a pedal configured to detect and/or quantify a force applied by the teleoperator, wherein a processing subsystem (e.g., remotely located from the vehicle, onboard the vehicle, remote computing system, etc.) determines a control signal based on the force. In a specific example, the amount of force applied by the teleoperator is used to determine a percentage of braking (e.g., distance that the brake pedal is depressed) to be applied at the vehicle by a pedal actuation subsystem, wherein the control signal includes the percentage of braking and is communicated wirelessly to a control subsystem onboard the vehicle.

In variations of the system wherein a vehicle receives inputs from multiple sources (e.g., from multiple teleoperators, from a teleoperator and a human operator, from an autonomous system and a teleoperator, from an autonomous system and a human operator, etc.), the control signal applied to the system (e.g., applied to actuate a pedal actuated valve 110, applied to actuate an electronically controlled valve 120, etc.) can include any or all of: the most conservative control signal received (e.g., control signals which applies maximum braking), an averaged control signal (e.g., averaged percentage of braking, weighted average percentage of braking, etc.), a predetermined control signal (e.g., control signal configured to apply maximum braking), a prioritized control signal (e.g., a human operator's control signal instead of a teleoperator's control signal, a teleoperator's control signal instead of an autonomous control signal, a human operator's control signal instead of an autonomous control signal, etc.), and/or any other suitable control signal.

However, the vehicle braking system 100 can include, be implemented by, and/or execute at any other suitable related systems.

The vehicle braking system 100 is operable between various operating modes, including a teleoperation mode, an autonomous mode, a manual mode, and a driver-assist mode. In some variations, the vehicle braking system can be operated in a plurality of operating modes simultaneously (e.g., the teleoperation mode and the driver-assist mode, the manual mode and the driver-assist mode, etc.). Operation of the vehicle braking system includes receiving control inputs for the pedal actuated valve 110 and the electronically actuated valve 120. The control inputs can include a physical input (e.g., a force applied to the pedal) and/or physically-derived input (e.g., a force applied to the pedal that moves the pedal and thereby adjusts an electrical signal output value related to the pedal position, such as via a potentiometer, and/or a mechanical output value such as the position of a linkage connected to the valve and the pedal that controls the valve output pressure, etc.). The control inputs can additionally or alternatively include a signal input (e.g., an electrical signal level input that is amplified to drive the valve, an electrical signal input that is at a power level sufficient to drive the valve without amplification, a pressure signal input such as for a pneumatically actuated valve or hydraulically actuated valve, etc.).

Figure 3:
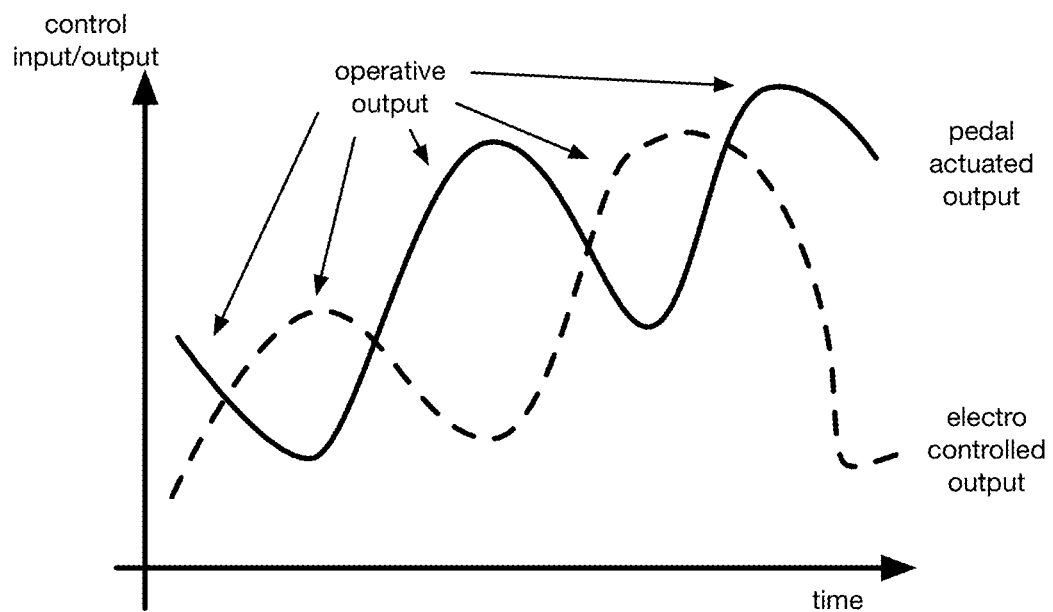
FIG. 3 depicts a specific example output generated in accordance with a variation of the vehicle braking system.

In each of the various operating modes, the operative output (e.g., the output pressure of the compressed or pressurized fluid) of the vehicle braking system is preferably the more conservative output (e.g., the output that causes a higher degree of braking, the greater pressure in system configurations wherein higher pressure corresponds to more braking, the lesser pressure in system configurations wherein lower pressure corresponds to more braking, etc.) between the pedal-actuated output (e.g., the signal value that controls the output pressure of the pedal actuated valve) and the electronically actuated output (e.g., the signal value that controls the output pressure of the electronically actuated valve). For example, as shown in FIG. 3, the output value of the pedal actuated valve and the electronically actuated valve can vary in time such that the output value of each valve is alternately the higher value, and the operative output can be selected (e.g., at the control subsystem, controller, control module, etc.) to be the higher value between the two values. The operative output can then be applied to each valve to control the output pressure of the valve, such that the two valve output pressures are substantially identical. In related examples, the pressurized fluid circuit (e.g., the network of fluid transmission lines and related components interconnecting the valves, fluid source, fluid sink, load, etc.) can be configured such that the output pressure of the vehicle braking system as a whole (e.g., directly upstream of the load) is equal to the more conservative output pressure of each of the pedal actuated and electronically actuated valve. However, the vehicle braking system can additionally or alternatively be otherwise suitably configured and/or operated (e.g., such that the less conservative output is taken as the operative output, such that the more conservative output is taken as the operative output in any other suitable manner, etc.).

In the teleoperation mode, one or more inputs can be received at the pedal actuated valve. An input to the pedal actuated valve can be generated by the pedal actuation subsystem, wherein the pedal actuation subsystem receives a control signal from a remote operator and is actuated in accordance with the control signal, and the input to the electronically controlled valve is preferably generated independently by the onboard control subsystem and made substantially identical to the input to the pedal actuated valve. Additionally or alternatively, the input to the pedal actuated valve can be substantially negligible, and the input to the electronically controlled valve can be based directly on a control signal received from the remote operator. However, the teleoperation mode can include otherwise suitably operating the vehicle braking system.

Variations of the system and/or method can enable robustness of the vehicle against control failure (e.g., failure-resistant redundancy). In examples, the vehicle braking system can be configured to automatically and actively apply the brakes in the event of communication failure (e.g., a detected lost data packet having a control signal, a received incomplete data packet, a time of no detected communication exceeding a predetermined threshold, etc.) between the vehicle and a remote operator, a failure of an autonomous vehicle control system (e.g., data link severance, computational error, sensor failure, etc.), and any other failure in vehicle control or operation during driving of the vehicle. In such variations, the vehicle braking system can provide a parallel control pathway (e.g., in parallel to a pedal-actuated control pathway) that is separately controlled and/or actuated, to eliminate a single-point failure mode associated with the pedal actuation of vehicle brakes.

The failure mode can be triggered by any or all of: a loss of communication between a teleoperator and a communication subsystem of the vehicle braking system 100, the passing of a period of time longer than a predetermined threshold (e.g., 0.1 seconds, 1 second, 3 seconds, 5 seconds, 10 seconds, greater than 10 seconds, etc.) wherein no communication exists between a teleoperator and a communication subsystem of the vehicle braking system, the passing of a period of time longer than a predetermined threshold (e.g., 0.1 seconds, 1 second, 3 seconds, 5 seconds, 10 seconds, greater than 10 seconds, greater than 1 minute, between 1 second and 1 hour, etc.) since a last control signal was received at a communication subsystem, a detected lost data packet, a detected interference with a teleoperator communication subsystem and/or a vehicle communication subsystem, and/or any other suitable trigger.

In a first variation of the teleoperation mode, a teleoperator controls an operation of the pedal actuated valve through a first set of control signals which are received at a control subsystem (e.g., via a communication module) onboard the vehicle. A second set of control signals (e.g., originating at the same control subsystem, originating at a different control subsystem, identical to the first set of control signals, different from the first set of control signals, determined based on the first set of control signals, etc.) can optionally control an operation of the electronically controlled valve. The second set of control signals is preferably chosen such that the outputs of the pedal actuated valve and the electronically controlled valve are substantially identical (e.g., have the same pressure value, have a pressure value within a predetermined percentage range of the pedal actuated valve pressure value, etc.). The second set of control signals can be determined based on any or all of: the first set of control signals, a pressure value as measured in one or more pressure sensors (e.g., pedal actuated valve pressure sensor), and/or any other suitable signals and/or values. In the event that any or all of the first set of control signals are not received (e.g., in the event that communication is lost with the teleoperator, the communication module is faulty, the vehicle has entered an area inaccessible of wireless communication, etc.), which characterizes a failure mode (e.g., and subsequently triggers an autonomous operation mode), the second set of control signals can be independently determined at the control subsystem, such that the electronically controlled valve triggers braking of the vehicle. The second set of control signals in a failure mode preferably functions to bring the vehicle to a complete stop, further preferably during and/or after the vehicle has pulled over to the side of the road (or other safe location). Additionally or alternatively, the second set of control signals can enable the vehicle to keep moving (e.g., at a predetermined speed, at its last speed prior to entering the failure mode, etc.), such as in the event that the failure mode triggers an autonomous mode (e.g., as described below). During the failure mode, the pedal actuated value can optionally be any or all of: closed (e.g., for a fail-closed valve), open (e.g., for a fail-open valve), dynamically controlled (e.g., with the same control signals as those controlling the electronically controlled valve), or in any other state of operation.

In a specific example of this variation, a teleoperator (e.g., remotely located driver) determines a desired braking parameter (e.g., braking 'on', braking 'off', a percentage of maximum braking, a time until complete braking, a desired speed, a desired decrease in speed, etc.), and communicates the desired braking parameter to a control subsystem of the vehicle through a set of wireless control signals, which are received at a communication module of the vehicle, wherein the pedal actuated valve operates based on the control signals. The control subsystem operates the electronically actuated valve according to a second set of control signals (e.g., same control signals as those received from the teleoperator, control signals resulting in a uniform pressure in the braking system, etc.). In the event that the control signals from the teleoperator cannot be received, the second set of control signals are configured such that braking can be applied through the electronically actuated valve.

In the autonomous mode, the input to the pedal actuated valve is preferably generated by the pedal actuation subsystem, wherein the pedal actuation subsystem receives a control signal generated by an onboard computing system and is actuated in accordance with the control signal, and the input to the electronically controlled valve is also based on the control signal generated by the onboard computing system such that the outputs of the pedal actuated valve and the electronically controlled valve are substantially identical. Additionally or alternatively (e.g., in variations of the system excluding a pedal actuation subsystem), an input to the electronically controlled valve can be based on a control signal generated by an onboard computing system (e.g., part of an onboard control subsystem) and/or onboard control subsystem.

In the manual mode, the input to the pedal actuated valve is preferably generated by a human operator residing within the vehicle and/or a human operator directly controlling the pedal actuation subsystem (e.g., via a locally applied force from a human operator to the pedal actuation subsystem), and an input to the electronically controlled valve is determined based on the input to the pedal actuated valve (e.g., to substantially match the input to the pedal actuated valve).

Figure 4:
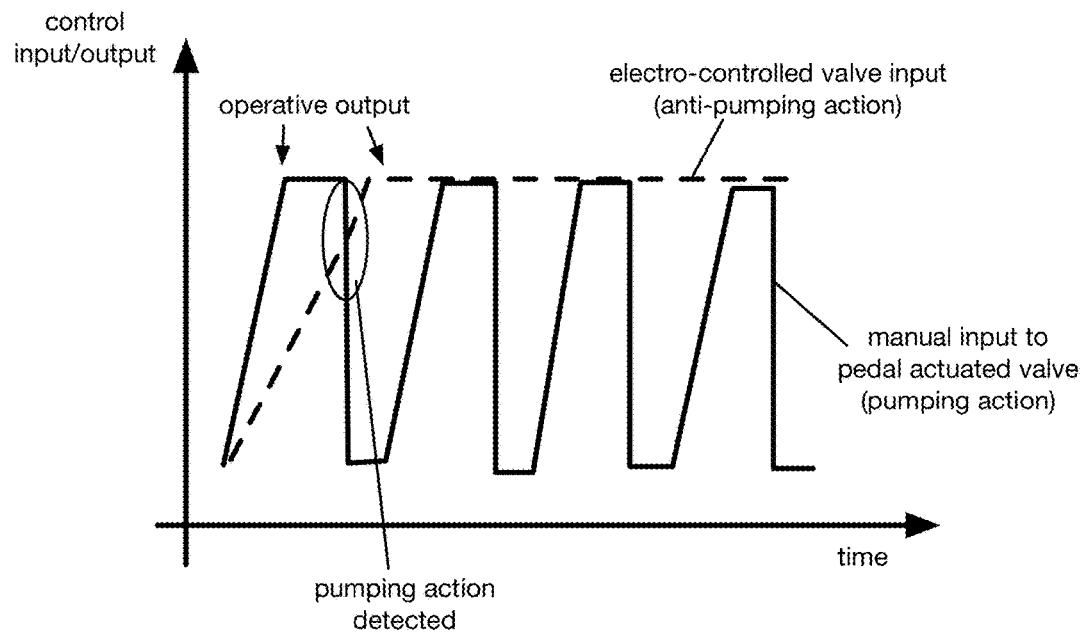
FIG. 4 depicts a specific example output generated in accordance with a variation of the vehicle braking system.

In the driver-assist mode, the vehicle braking system can override inputs manually generated by a driver to enhance vehicle controllability and/or safety. For example, as shown in FIG. 4, the vehicle braking system can enforce an anti-pumping action that maintains brake pressure (e.g., delivered pressure at the load) at a substantially constant pressured despite oscillatory inputs to the pedal-actuated valve (e.g., by a driver attempting a pumping action). The driver-assist mode can thus include detecting a pumping action or similar oscillatory input (e.g., based on the negative rate of change of the pedal actuated valve input, the absolute vale of the pedal actuated valve input, or other characteristic of the pedal actuated valve input exceeding, falling below, or matching a threshold value).

However, the vehicle braking system can additionally or alternatively be operated between any suitable operating modes.

The pedal actuated valve functions to modulate and/or maintain the pressure delivered to the load based on the position of a pedal of the vehicle. The pedal actuated valve can also function to provide manual control functionality to the vehicle braking system. The pedal actuated valve includes a supply inlet connected to the compressed air supply, a vent outlet in fluid communication with a fluid sink, and a delivery outlet.

The pedal actuated valve is preferably integrated with the vehicle (e.g., during manufacture), but can alternatively be added subsequent to manufacture (e.g., as an aftermarket upgrade, a third-party retrofit, etc.). The pedal actuated valve is preferably mechanically actuated by the vehicle pedal (e.g., connected to the pedal by a linkage or other suitable force transfer mechanism), but can alternatively be indirectly actuated by the pedal (e.g., actuated by a pressure force or electromotive force in response to the motion and/or position of the vehicle pedal).

The supply inlet of the pedal actuated valve functions to connect the pedal actuated valve to the fluid source. The supply inlet is preferably coupled to the fluid source by a portion of the network of fluid transmission lines (e.g., an air hose, an air line, a hydraulic line, etc.), but can additionally or alternatively be otherwise suitably coupled to the fluid source. The supply inlet can also be coupled (e.g., by a fluid transmission line) to the supply inlet of the electronically controlled valve, such that the supply pressure to both the pedal actuated valve and the electronically controlled valve are equivalent.

The vent outlet of the pedal actuated valve 114 (e.g., the first vent outlet) functions to connect the pedal actuated valve 110 to the fluid sink 150. The vent outlet can be an orifice of the pedal actuated valve (e.g., in variations wherein the fluid sink is the external environment) that is directly within and/or otherwise suitably in fluid communication with the fluid sink. However, in alternative variations the vent outlet can be connected to the fluid sink (e.g., a dump tank, a reservoir, etc.) by a portion of the network of fluid transmission lines (e.g., an air hose, an air line, a hydraulic line, etc.). The vent outlet can additionally or alternatively be otherwise suitably coupled to the fluid sink.

The vent outlet can, in some variations of the vehicle braking system, be referred to as the external vent outlet, in contrast to the vent outlet of the electronically controlled valve which is connected, in such variations, to the external vent outlet such that the vent pathways of the electronically controlled valve and the pedal actuated valve are shared.

The delivery outlet of the pedal actuated valve 116 (e.g., the first delivery outlet) functions to couple the pedal actuated valve to the load. The delivery outlet can also function as a portion of the vent path of the electronically controlled valve, as shown by example in FIG. 2. The delivery outlet is preferably directly coupled to the check valve (e.g., by a fluid transmission pathway of the network of fluid transmission pathways) and to the vent outlet of the electronically controlled valve, and indirectly coupled (e.g., by way of the check valve) to the load. However, the delivery outlet can be otherwise suitably coupled to other components of the vehicle braking system by the network of fluid transmission pathways.

The electronically controlled valve 120 functions to modulate and/or maintain the pressure of the fluid delivered to the load based on the received electrical signal (e.g., control input transformed into an electrical signal, electrical drive current or voltage, etc.). The electronically controlled valve can include a supply inlet connected to the compressed air supply, a vent outlet connected to the delivery outlet of the supply valve, and a delivery outlet connected to the brakes.

The electronically controlled valve 120 is preferably added to the vehicle post-manufacturing (e.g., as a retrofit, as an aftermarket upgrade, as a component of a remote operation and/or autonomous operation system, etc.), but can alternatively be integrated with the vehicle during manufacture (e.g., by an OEM). The electronically controlled valve is preferably directly electromagnetically actuated based on a control signal (e.g., wherein the electronically controlled valve includes a solenoid valve or other suitable electromagnetically actuated valve) but can alternatively be indirectly actuated by an electromagnetic signal (e.g., actuated by a pressure force in response a received control signal).

In preferred variations, the electronically controlled valve 120 includes an electropneumatic solenoid valve having a release port, wherein the electronically controlled valve is configured to proportionally control pressure in a fixed fluid (e.g., air) volume, such that the electronically controlled valve can integrate with a conventional semi-truck pedal actuated valve (e.g., variable pressure control valve to a fixed volume wherein reducing pressure in the volume causes the valve to vent to air). Additionally or alternatively, the electronically controlled valve can be configured to control pressure in a binary fashion, control flow rate (e.g., include an electronically controlled butterfly valve), be configured to integrate with another suitable valve, or be otherwise configured in any suitable way.

The electronically controlled valve 120 can be operable in any number of operation modes, such as any or all of: an unpowered mode, a powered mode, an increasing power mode, a decreasing power mode, and/or any other suitable mode. In an example of the variation shown in FIG. 2, the electronically controlled valve includes the following operation modes: an unpowered mode, wherein the supply inlet connects to the vent, thereby causing the pressure delivered to the air brakes to approach and/or have a value of zero; a powered mode, wherein the current in a solenoid of the electronically controlled valve creates a magnetic force, thereby causing a connection to be established between the supply inlet and the delivery outlet and an increased pressure to be applied at the air brakes; and a reduced power mode, wherein the delivery outlet connects to the vent, thereby causing the established pressure at the delivery outlet to vent.

In a variation, the electronically controlled valve 120 is controlled by a control signal that is generated to produce an equivalent pressure output to the pedal actuated valve. In an example of this variation, the pedal actuation subsystem actuates the pedal actuated valve based on a received control signal, and a second control signal is generated to control the electronically controlled valve and produce an identical output pressure corresponding to the same braking force. In another example, the same control signal simultaneously drives the pedal actuation subsystem (e.g., and the pedal actuated valve in response) and the electronically controlled valve, resulting in substantially equivalent outputs.

In another variation, the output of the electronically controlled valve 120 is controlled by the onboard computing system using a control signal that is computed independently of that which controls the pedal actuated valve (e.g., by a human operating the system in a manual mode, by a remote operator activating the pedal actuation subsystem, etc.). In some examples of this variation, the output of the electronically controlled valve can be utilized if it is the more conservative value between that of the electronically controlled valve and that of the pedal actuated valve. In alternative examples of this variation, both the pedal actuated valve and the electronically controlled valve are actuated according to their respective inputs, and the configuration of the fluid transmission network results in the more conservative pressure being delivered to the load. In additional or alternative examples of this variation, such as those in which the electronically controlled valve achieves better deceleration (e.g., smoother deceleration, more gradual deceleration, more immediate deceleration, etc.), the output of the electronically controlled valve is used to determine a control signal for the pedal actuated valve.

The vehicle braking system is preferably configured to apply the brakes in the event of a power loss or similar failure rendering a loss of vehicle control (e.g., control of vehicle braking, steering, throttle, sensors, etc.). Accordingly, in variations wherein positive pressure applied to the brakes causes the brakes to be applied, the electronically controlled valve is configured to close in the absence of power (e.g., in a fail-closed configuration) to prevent pressure bleeding from the brake lines. Similarly, in variations wherein relieving brake line pressure causes the brakes to be applied (e.g., by a spring-back mechanism), the electronically controlled valve is configured to remain open in the absence of power (e.g., in a fail-open configuration) to permit pressure bleeding from the brake lines.

Alternatively, when a human operator (e.g., driver) is present within the vehicle, the vehicle braking system can optionally be configured as follows: in variations wherein positive pressure applied to the brakes causes the brakes to be applied, the electronically controlled valve is configured to open in the absence of power (e.g., in a fail-open configuration) to permit pressure bleeding from the brake lines, and in variations wherein relieving brake line pressure causes the brakes to be applied (e.g., by a spring-back mechanism), the electronically controlled valve is configured to close in the absence of power (e.g., in a fail-closed configuration). This can function to prevent potential complications required to reboot the system in the event of a failure (e.g., power failure), since the operator can apply the brakes through the pedal actuated valve. Additionally or alternatively, the valves can be configured as described above in the previous variation and/or configured in any other suitable way.

The supply inlet of the electronically controlled valve 122 (e.g., $2^{nd}$ supply inlet) functions to connect the electronically controlled valve to the fluid source. The supply inlet is preferably coupled to the fluid source by a portion of the network of fluid transmission lines (e.g., an air hose, an air line, a hydraulic line, etc.), but can additionally or alternatively be otherwise suitably coupled to the fluid source. The supply inlet can also be coupled (e.g., by a fluid transmission line) to the supply inlet of the pedal actuated valve, such that the supply pressure to both the pedal actuated valve and the electronically controlled valve are equivalent.

The vent outlet of the electronically controlled valve (e.g., the second vent outlet) functions to connect the electronically controlled valve to the fluid sink by way of the vent outlet of the pedal actuated valve (e.g., the first vent outlet). The second vent outlet is preferably connected to the first vent outlet by a portion of the network of fluid transmission lines (e.g., an air hose, an air line, a hydraulic line, etc.), but can additionally or alternatively be connected directly to the delivery outlet of the pedal actuated valve (e.g., or a fluid transmission line connected thereto) and to the first vent outlet by way of the internal structure of the pedal actuated valve (e.g., a manifold thereof). The vent outlet can additionally or alternatively be otherwise suitably coupled to the fluid sink.

Figure 2:
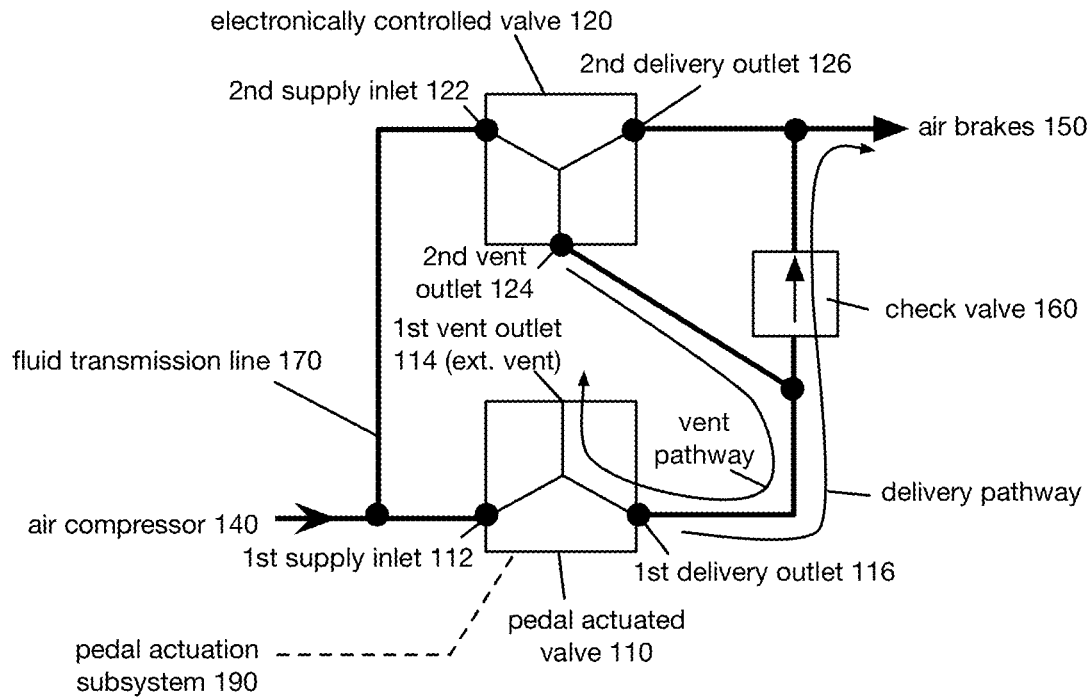
FIG. 2 depicts a specific example of the vehicle braking system.

As shown by example in FIG. 2, the vent outlet of the electronically controlled valve is preferably routed through the vent pathway of the pedal actuated valve, such that the electronically controlled valve and the pedal actuated valve share a release (e.g., venting) pathway to the external environment or other suitable release reservoir (e.g., a reservoir at lower pressure than the pressurized fluid lines of the vehicle braking system).

The check valve 16o functions to prevent backflow and/or back pressure from the load from impinging directly on the delivery outlet of the pedal actuated valve. Thus, in cases wherein the load pressure is greater than the delivery pressure of the pedal actuated valve, backflow does not occur unless the delivery pressure of the electronically controlled valve is also less than the load pressure, in which case the load pressure is vented through the external vent (e.g., the vent outlet of the pedal actuated valve) as shown in FIG. 2.

The check valve 16o is preferably arranged downstream of the vent output of the electronically controlled valve and the delivery output of the supply valve and upstream of the brakes. The check valve and this placement functions to enable the pedal actuated valve and/or the electronically controlled valve to apply braking pressure immediately (e.g., in real time, in substantially real time, with a delay less than 1 second, etc.) and irrespective of the engagement of the other valve (e.g., while the other valve is engaged, while the other valve is not engaged, etc.).

In variations without a check valve in this arrangement, several limitations and/or failures of the braking system can result. In a first example, in the absence of the check valve and with the parallel arrangement of the pedal actuated valve 110 and the electronically controlled valve 120, the $2^{nd}$ delivery outlet 126 would be connected to the $1^{st}$ vent outlet 114 when the electronically controlled valve 120 is unpowered, thereby causing a first complication wherein the electronically controlled valve 120 constantly releases pressure. Similarly, when the electronically controlled valve 120 is applied, the pedal actuated valve 11o would constantly release pressure. In a second example, wherein the arrangement of the first example is modified such that each of the valves 11o and 120 has a check valve arranged downstream, a separate complication arises wherein pressure can be increased in the brake chamber but cannot be released.

As shown in a preferred variation in FIG. 2, the arrangement of the check valve is such that the pedal actuated valve 11o and the electronically controlled valve 120 share a release ($2^{nd}$ vent outlet 124 vents through $1^{st}$ vent outlet 114), as shown in the vent pathway of FIG. 2. The pressure produced by the electronically controlled valve 120 (e.g., pressure established at the $2^{nd}$ delivery outlet 126) is prevented from releasing through the $1^{st}$ vent outlet 114 by the check valve. When the electronically controlled valve 120 is not engaged (e.g., unpowered, not actively braking, etc.) and the pedal actuated valve 110 is engaged, the fluid from the pedal actuated valve's $1^{st}$ delivery outlet 116 can reach the air brakes 150 both through the check valve 160 and through the second delivery outlet 126 (e.g., via the $2^{nd}$ vent outlet 124 and the $2^{nd}$ delivery outlet 126).

Additionally or alternatively, the check valve can be otherwise suitably arranged.

Further additionally or alternatively, the check valve can include a bidirectional flow, which functions as a pressure "OR" gate, and is configured enable fluid flow in two opposing directions and prevent backflow in two opposing directions. This can confer the advantage of minimizing a complexity and/or number of parts of the system (e.g., manifold housing all of the valves, pathways, and connectors). Additionally or alternatively, the bidirectional check valve can confer the advantage of preventing a need for all of the release pressure to have to be routed through the electronically controlled valve 120.

The vehicle braking system can optionally include a control subsystem (e.g., an onboard control system), which functions to control other components of the braking system (e.g., the electronically controlled valve, the pedal-actuated valve by way of an actuation subsystem, etc.). The control subsystem can, in variations, include any elements analogous to those described in U.S. application Ser. No. 15/825,906, filed 29 Nov. 2017, which is incorporated herein in its entirety by this reference. However, the control subsystem can additionally or alternatively include an onboard computing subsystem and/or any suitable components for controlling components of the vehicle braking system (e.g., a processor, memory, motor controllers, signal encoders, pneumatic actuator controllers, etc.).

The control subsystem can include a communications module, which functions to provide signal communication capability to the vehicle and, by extension, to the vehicle braking system. The communications module can include a radio transceiver, and any other suitable communications-related components or elements (e.g., WiFi module, WiFi chip, Bluetooth module, Bluetooth chip, etc.).

The vehicle braking system can optionally include a pedal actuation subsystem, which functions to actuate the pedal of the vehicle based on received control instructions (e.g., received from the control subsystem, received from a human physically interacting with the pedal actuation subsystem via a force transmission mechanism, etc.). Control interfaces actuated by the pedal actuation subsystem can include human-oriented control interfaces, such as pedals (e.g., clutch pedal, gas pedal, brake pedal, etc.), a shifter (e.g., shift pedal), and any other suitable pedal control mechanism configured for operation by a human (e.g., a human foot).

Figure 9:
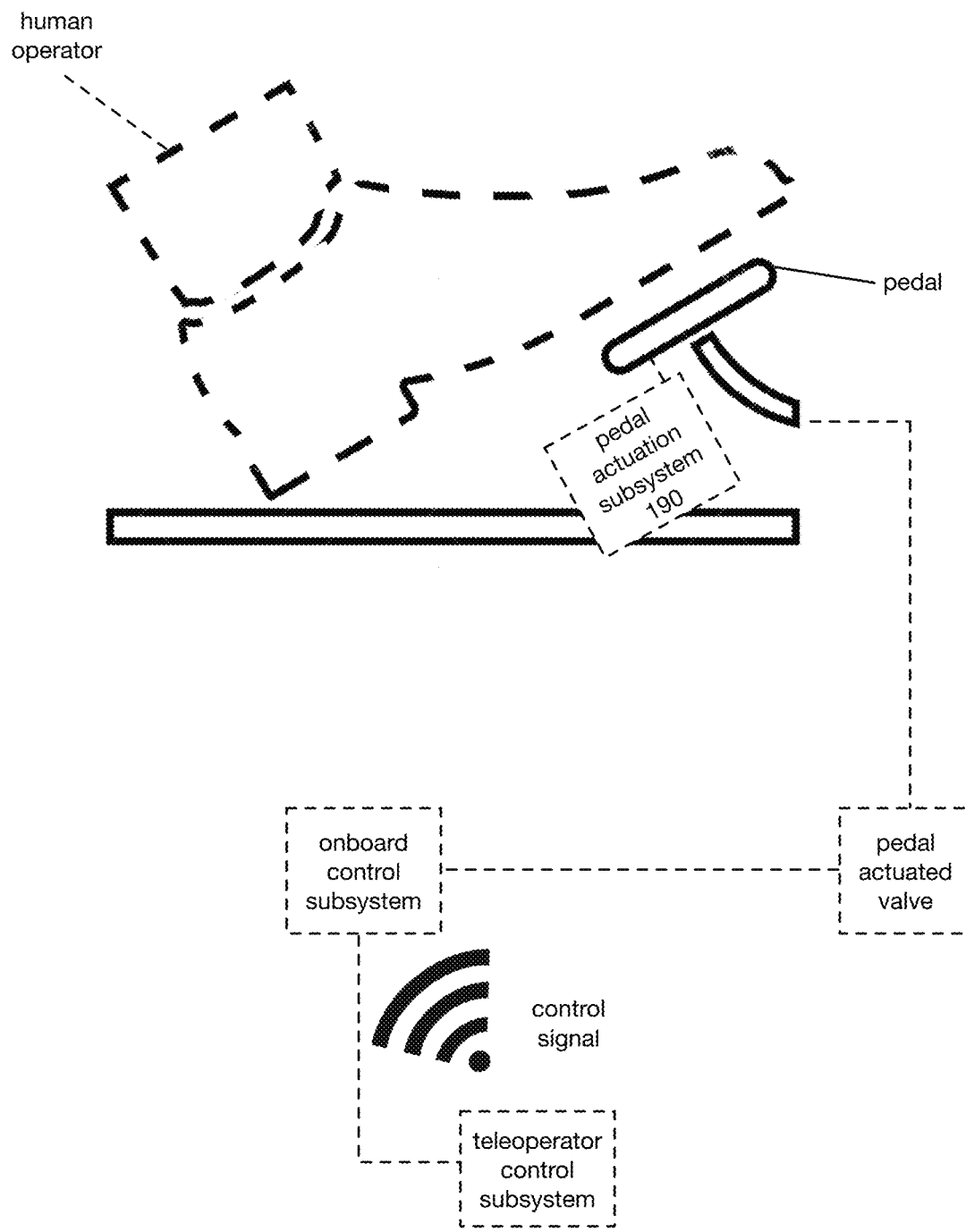
FIG. 9 depicts a specific example of a pedal actuated subsystem.

The pedal actuation subsystem 19o (e.g., as shown in FIG. 9) can receive inputs, including control instructions and/or operator inputs. Control instructions are preferably received from the control subsystem, and can include voltage levels, current levels, time-varying signals, constant signals, trigger- and/or event-based signals, and any other suitable instructions and/or parameters that can affect an output of the pedal actuation subsystem (e.g., an actuation of a control interface by the pedal actuation subsystem). Operator inputs are preferably received from an operator (e.g., a driver in the vehicle, a teleoperator, etc.), and can include a human depressing a pedal manually, a transmission from a teleoperator including instructions to actuate a portion of the actuation subsystem, and any other suitable inputs from an operator.

The pedal actuation subsystem 19o can provide outputs, including state data indicative of the state of actuators of the pedal actuation subsystem. For example, the actuation subsystem can provide one or more signals with amplitude values proportional to a force applied by actuators to control interfaces of the vehicle (e.g., the force applied by a pedal actuator of the actuation subsystem, etc.). In another example, the actuation subsystem can provide outputs indicative of force applied by a human to control interfaces (e.g., force applied to a pedal by a human operator, etc.). A human operator herein refers to an operator onboard the vehicle (e.g., in the driver's seat, proximal to a braking mechanism such as a braking pedal of the vehicle, etc.). These outputs can be used as a basis to determine the output of the electronically controlled valve (e.g., to substantially match the output pressure, delivery pressure, etc.), or be otherwise used.

The pedal actuation subsystem 19o preferably includes a set of components configured to mechanically adjust (e.g., depress, partially depress, release, partially release, etc.) a brake pedal of the vehicle (e.g., based on a set of control signals received from a teleoperator, based on a set of control signals generated at an onboard computing system of the vehicle, etc.), but can additionally or alternatively include any other suitable components. The set of components can include any or all of: plates (e.g., metal plates, steel plates, etc.), motors (e.g., rotary motors, linear motors, etc.), levers, springs, weights, hinges, magnetic mechanisms (e.g., to magnetically attract and repel a brake pedal), and/or any other suitable components. The pedal actuation subsystem 19o can be arranged proximal to the brake pedal, such as any or all of: partially or fully underneath the brake pedal (e.g., to not interfere with the ability of a human operator to depress the brake pedal from above); above the brake pedal; adjacent to the brake pedal; or otherwise arranged. The pedal actuation subsystem 19o is preferably arranged such that a human operator can still actuate the brake pedal (e.g., without being obstructed by the pedal actuation subsystem, without colliding with the pedal actuation subsystem, etc.), but can additionally or alternatively be removable (e.g., when a human operator enters the vehicle), intersecting with a path a human operator would traverse to depress the brake pedal (e.g., to prevent a human operator from depressing the brake pedal, to prevent a human operator from releasing the brake pedal, to augment a human operator's depression of the brake pedal, to augment a human operator's release of the brake pedal, etc.), or otherwise arranged.

In one variation, the pedal actuation subsystem 19o includes a set of one or more rotary motors arranged underneath the brake pedal configured to pull down a set of one or more metal plates arranged over a top surface of the brake pedal.

In a second variation, the pedal actuation subsystem 19o includes a set of one or more rotary motors arranged underneath the brake pedal configured to pull down a set of one or more plates attached to a bottom surface of the brake pedal.

The system 100 can additionally include one or more housings (e.g., manifolds) and connectors configured to connect and/or house any or all of the system components. Additionally or alternatively, the housing can be configured to connect any or all of the system 100 with the vehicle.

Figure 8:
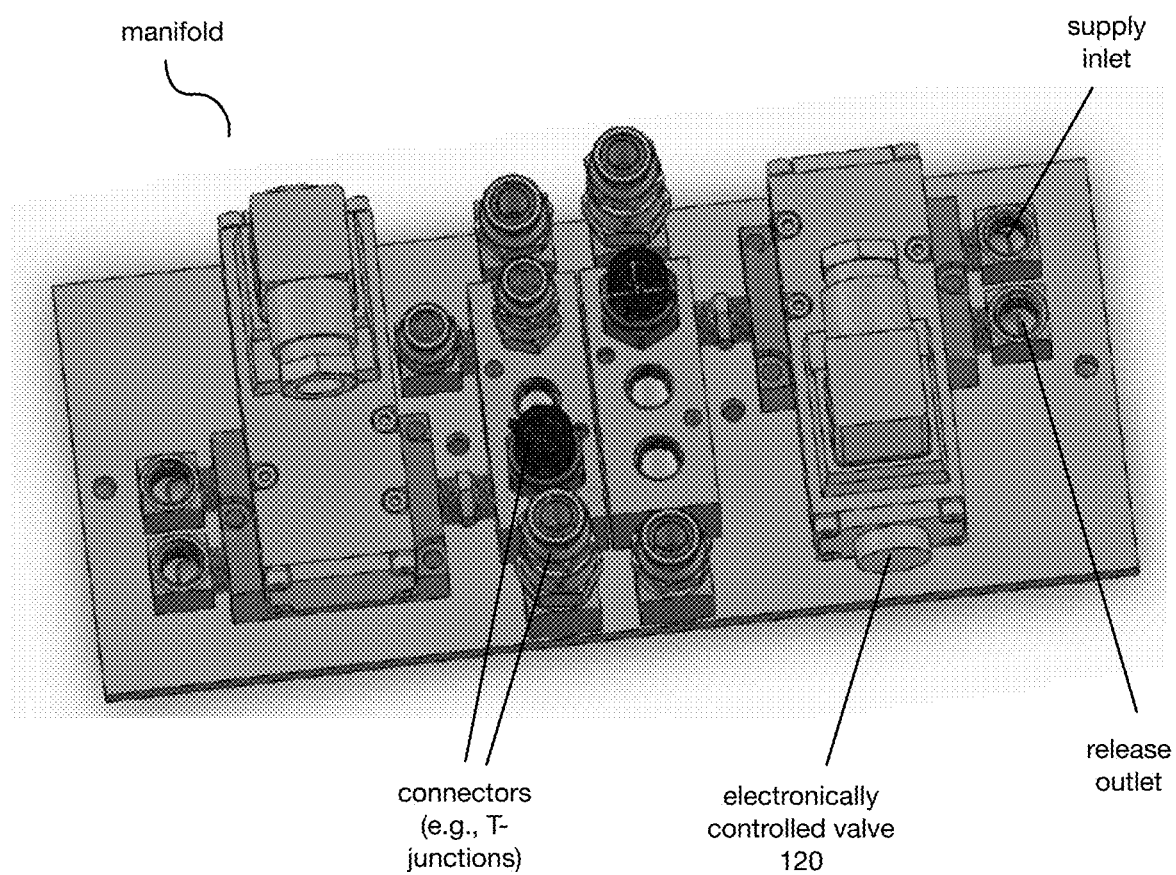
FIG. 8 depicts a specific example of a manifold of the vehicle braking system.

In a first variation (e.g., as shown in FIG. 8), the system includes a manifold with a set of inlets and outlets configured to mount to an engine compartment on the vehicle chassis, wherein the inlets and outlets receive a set of connectors (e.g., T-junctions) and tubes configured to fluidly connect the system components as described above.

The system 100 can additionally include one or more pressure sensors, which can individually and/or collectively function to determine a pressure value associated with any or all of: a valve inlet (e.g., pedal actuated valve inlet, electronically controlled valve inlet, solenoid valve inlet, etc.), a valve outlet (e.g., pedal actuated valve outlet, electronically controlled valve outlet, solenoid valve outlet, etc.), a compressor, fluidic pathway, and/or any other component or air pathway of the system. Each of the pressure sensors is preferably calibrated to confirm that an output from the pressure sensor corresponds with (e.g., matches, is within a predetermined threshold range, etc.) a pressure measured in the vehicle, but can additionally or alternatively be calibrated and/or configured.

However, the system 100 can additionally or alternatively include any other suitable components for vehicle braking.

In a first variation (e.g., as shown in FIG. 2), a vehicle braking system 100 is configured to be integrated into a front wheel air brake line of a semi-truck, wherein the vehicle braking system 100 includes: a pedal actuated valve 110 defining a $1^{st}$ supply inlet 112 configured to receive air from an air compressor 140 (e.g., via a first compressed air tank), a $1^{st}$ vent outlet 114 configured to vent air, and a $1^{st}$ delivery outlet 116 configured to deliver air to a set of air brakes 150o; an electronically controlled valve 120 arranged in parallel with the pedal actuated valve 11o defining a $2^{nd}$ supply inlet 122 configured to receive air from an air compressor 140 (e.g., via a first compressed air tank), a $2^{nd}$ vent outlet 124 configured to vent air, and a $2^{nd}$ delivery outlet 126 configured to deliver air to a set of air brakes 150o; a check valve 160 arranged downstream of the $1^{st}$ delivery outlet 116 configured to enable air flow from the $1^{st}$ delivery outlet 116 to the air brakes 150 and prevent air flow from the $2^{nd}$ delivery outlet 126 to the $1^{st}$ vent outlet 114 (e.g., via the $1^{st}$ delivery outlet); and a set of fluid transmission lines 170 connecting any or all of the components described above. The system 100 further preferably includes a manifold to house the components and attach the system 100 to an engine chamber on the vehicle chassis; a control subsystem configured to receive and implement a set of control signals (e.g., generated by an onboard computing system, received from a teleoperator, etc.); and/or any other additional components (e.g., a pedal actuation subsystem). The system 100 can be operable in any number of operation modes, such as any or all of those described above.

Figure 7:
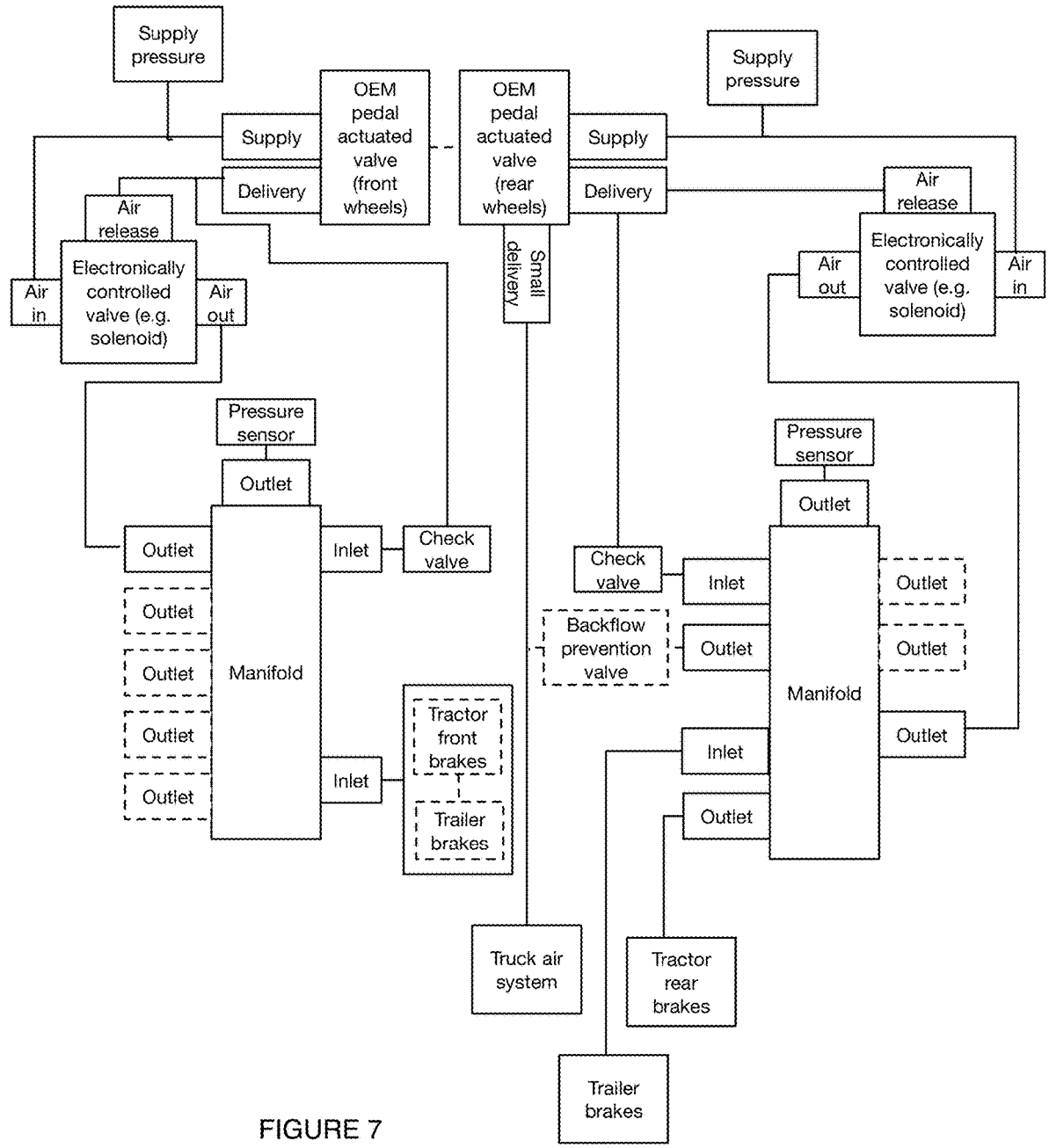
FIG. 7 depicts a specific example of an integration of the vehicle braking system in a vehicle.

In an additional or alternative variation (e.g., as shown in FIG. 5, as shown in FIG. 7), a vehicle braking system 100 is configured to be integrated into a rear wheel air brake line and a trailer wheel air brake line of a semi-truck, wherein the vehicle braking system 100 includes: a pedal actuated valve 11o defining a $1^{st}$ supply inlet 112 configured to receive air from an air compressor 140 (e.g., via a first compressed air tank), a $1^{st}$ vent outlet 114 configured to vent air, and a $1^{st}$ delivery outlet 116 configured to deliver air to a set of air brakes 150 (e.g., trailer brakes and rear tractor brakes); an electronically controlled valve 120 arranged in parallel with the pedal actuated valve 110 defining a $2^{nd}$ supply inlet 122 configured to receive air from an air compressor 140 (e.g., via a first compressed air tank), a $2^{nd}$ vent outlet 124 configured to vent air, and a $2^{nd}$ delivery outlet 126 configured to deliver air to a set of air brakes 150; a first check valve 160 arranged downstream of the $1^{st}$ delivery outlet 116 configured to enable air flow from the $1^{st}$ delivery outlet 116 to the air brakes 150 and prevent air flow from the $2^{nd}$ delivery outlet 126 to the $1^{st}$ vent outlet 114 (e.g., via the $1^{st}$ delivery outlet); and a set of fluid transmission lines 170 connecting any or all of the components described above. The system 100 further preferably includes a manifold to house the components and attach the system 100 to an engine chamber on the vehicle chassis; a control subsystem configured to receive and implement a set of control signals (e.g., generated by an onboard computing system, received from a teleoperator, etc.); and/or any other additional components (e.g., a pedal actuation subsystem). The system 100 can be operable in any number of operation modes, such as any or all of those described above.

Figure 6:
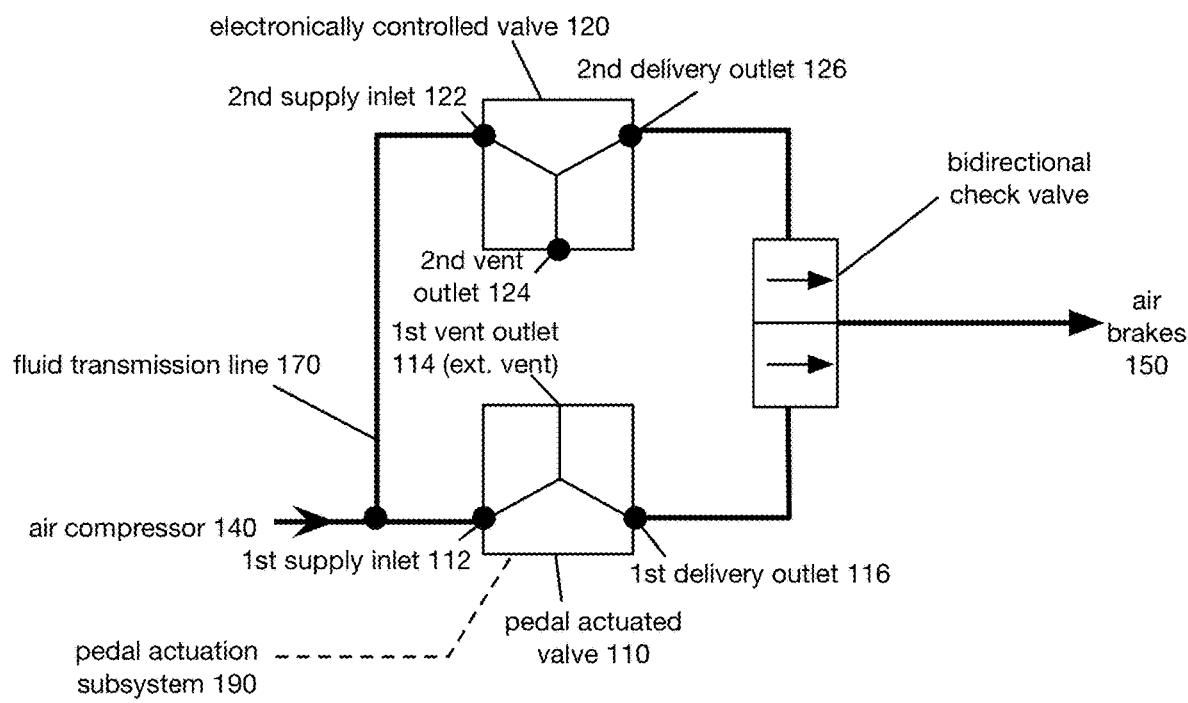
FIG. 6 depicts a specific example of the vehicle braking system.

In an alternative variation (e.g., as shown in FIG. 6), the vehicle braking system 100 includes a bidirectional check valve.

4. Method

As shown in FIG. 10, a method for vehicle braking includes: operating at least one of a first valve and a second valve. Additionally, the method can include any or all of: receiving a control signal from a remote operator; actuating a pedal actuation subsystem based on the control signal; determining a lost communication between the remote operator and the vehicle; operating a pedal actuated valve based on an input from a human operator at a pedal of the vehicle; determining a second control signal (e.g., at an onboard computing system, a remote computing system, storage, etc.); operating a first valve based on an input from the pedal actuation subsystem; operating a second valve based on the second control signal; operating a second valve based on a pressure associated with the first valve; and/or any other suitable processes.

The method functions implement one or more operation modes as described above. Additionally or alternatively, the method can function to apply braking to a vehicle at any suitable time and in any suitable way.

The method is preferably performed with the system 100 as described above, but can additionally or alternatively be performed with any suitable system.

In one variation of the method, the method includes: receiving a control signal from a remote operator; actuating a pedal actuation subsystem based on the control signal; operating a first valve based on an input (e.g., force) from the pedal actuation subsystem; determining a lost communication between the remote operator and the vehicle; determining a second control signal (e.g., at an onboard computing system, a remote computing system, storage, etc.); and operating the second valve based on the second control signal. Additionally or alternatively, the method can include any other suitable processes.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the various system components.

As a person skilled in the art will recognize from the previous detailed description and from the figures and claims, modifications and changes can be made to the preferred embodiments of the invention without departing from the scope of this invention defined in the following claims.

What is claimed is:

1. A system for redundant braking in a truck, the system comprising:
   a first valve, wherein the first valve is selectively operable by a pedal of the truck, wherein the first valve comprises:
      a first inlet in fluid communication with a fluid source;
      a first vent outlet in fluid communication with a fluid sink; and
      a first delivery outlet in fluid communication with a load;
   a pedal actuation subsystem, wherein the pedal actuation subsystem applies a force to the pedal based on a control signal received from a remote operator;
   a second valve arranged in parallel with the first valve, wherein the second valve is electronically controllable and selectively operable by a control subsystem of the truck, wherein the second valve comprises:
      a second inlet in fluid communication with the fluid source;
      a second vent outlet in fluid communication with the first vent outlet; and
      a second delivery outlet in fluid communication with the load;
   a check valve arranged between the first delivery outlet and the load, wherein the check valve is arranged downstream of the second vent outlet and configured to prevent fluid flow in a direction from the second delivery outlet to the first delivery outlet; and
   the control subsystem, wherein the control subsystem comprises a communication module configured to receive the control signal from the remote operator.

2. The system of claim 1, wherein the system is operable in a set of operation modes, the set of operation modes comprising a teleoperation mode, wherein in the teleoperation mode, the first valve is operated based on the control signal.

3. The system of claim 2, further wherein in the teleoperation mode the second valve is operated contemporaneously with the first valve based on a second control signal.

4. The system of claim 3, wherein the second control signal is determined based on a pressure associated with the first valve.

5. The system of claim 2, wherein in an event that the control signal cannot be received from the remote operator, the second valve is actuated based on a second control signal.

6. The system of claim 5, wherein the second control signal is configured to fluidly connect the second inlet and the second delivery outlet.

7. The system of claim 1, wherein the pedal actuation subsystem comprises a rotary motor arranged inferior to a superior broad surface of the pedal and a rigid plate arranged superior to the superior broad surface.

8. The system of claim 1, wherein the system is operable in a teleoperation mode, wherein in the teleoperation mode:
   the pedal actuation subsystem is actuated based on a control signal received wirelessly from a remote operator;
   the second valve is operated based a second control signal generated by an onboard computing system coupled to the control subsystem.

9. A system for redundant braking in a truck, the system comprising:
   a first valve, wherein the first valve is selectively operable by a pedal of the truck, wherein the first valve comprises:
      a first inlet in fluid communication with a fluid source;
      a first vent outlet in fluid communication with a fluid sink; and
      a first delivery outlet in fluid communication with a load;
   a second valve arranged in parallel with the first valve, wherein the second valve is electronically controllable and selectively operable by a control subsystem of the truck, wherein the second valve comprises:
      a second inlet in fluid communication with the fluid source;
      a second vent outlet in fluid communication with the first vent outlet; and
      a second delivery outlet in fluid communication with the load;
   a check valve arranged between the first delivery outlet and the load, wherein the check valve is arranged downstream of the second vent outlet and configured to prevent fluid flow in a direction from the second delivery outlet to the first delivery outlet; and
   the control subsystem, wherein the control subsystem comprises a communication module configured to receive a control signal from a remote operator.

10. The system of claim 9, further comprising a pedal actuation subsystem, wherein the pedal actuation subsystem applies a force to the pedal based on the control signal.

11. The system of claim 10, wherein the system is operable in a teleoperation mode, wherein in the teleoperation mode:
   the pedal actuation subsystem is actuated based on a control signal received from a remote operator;
   the second valve is operated based on a second control signal, wherein the second control signal is generated at a computing system onboard the vehicle.

12. The system of claim 11, wherein the system is further operable in at least one of:
   an autonomous mode;
   a driver assist mode; and
   a manual mode.

13. The system of claim 9, wherein the system is configured to be integrated in a retrofitted configuration into an original equipment manufacturer (OEM) braking system of the vehicle.

14. The system of claim 9, further comprising a pedal actuation subsystem, wherein the pedal actuation subsystem applies a force to the pedal based on the control signal.

15. The system of claim 14, wherein the pedal actuation subsystem comprises a rotary motor arranged inferior to a superior broad surface of the pedal and a rigid plate arranged superior to the superior broad surface.

16. The system of claim 9, wherein the system is operable in a set of operation modes, the set of operation modes comprising a teleoperation mode, wherein in the teleoperation mode, the first valve is operated based on the control signal.

17. The system of claim 16, further wherein in the teleoperation mode the second valve is operated contemporaneously with the first valve based on a second control signal.

18. The system of claim 17, wherein the second control signal is determined based on a pressure associated with the first valve.

19. The system of claim 16, wherein in an event that the control signal cannot be received from the remote operator, the second valve is actuated based on a second control signal.

20. The system of claim 19, wherein the second control signal is configured to fluidly connect the second inlet and the second delivery outlet.

* * * * *